(12) United States Patent
Bernhardt

(10) Patent No.: US 8,591,161 B1
(45) Date of Patent: Nov. 26, 2013

(54) MANEUVERING AUTONOMOUS ROTORCRAFT CARGO ATTACHMENT SYSTEM WITH MOTION COMPENSATION

(75) Inventor: Roger D. Bernhardt, Offallon, MO (US)

(73) Assignee: The Boeing Company, Chicago, IL (US)

( * ) Notice: Subject to any disclaimer, the term of this patent is extended or adjusted under 35 U.S.C. 154(b) by 115 days.

(21) Appl. No.: 13/252,851

(22) Filed: Oct. 4, 2011

(51) Int. Cl.
*B63B 27/00* (2006.01)
*B65G 1/00* (2006.01)
*B66B 17/00* (2006.01)
*F41A 9/00* (2006.01)

(52) U.S. Cl.
USPC .............. 414/137.6; 414/137.1; 414/137.2; 414/142.8; 414/331.06; 414/331.13; 414/569; 414/589; 414/590; 414/591; 414/592; 414/608; 414/618; 414/626; 414/680; 294/68.1

(58) Field of Classification Search
USPC .............. 414/137.6, 137.1, 137.2; 294/68.1, 294/82.1, 82.15, 82.26; 220/751
See application file for complete search history.

(56) References Cited

U.S. PATENT DOCUMENTS

| | | | | |
|---|---|---|---|---|
| 3,754,581 A | * | 8/1973 | Taggart | 141/279 |
| 4,054,103 A | * | 10/1977 | Gabriel | 114/258 |
| 4,826,228 A | * | 5/1989 | Dinitz et al. | 294/81.56 |
| 5,299,845 A | * | 4/1994 | Gabriel | 294/2 |
| 5,788,186 A | * | 8/1998 | White | 244/137.4 |
| 5,927,649 A | * | 7/1999 | Nykiforuk | 244/118.1 |
| 7,048,491 B2 | * | 5/2006 | Windbergs | 414/542 |
| 7,640,811 B2 | * | 1/2010 | Kennedy et al. | 73/634 |
| 7,693,617 B2 | * | 4/2010 | Dockter et al. | 701/3 |
| 8,074,828 B2 | * | 12/2011 | Hartley et al. | 220/751 |
| 2004/0032140 A1 | * | 2/2004 | Solstad | 294/82.15 |

* cited by examiner

*Primary Examiner* — Gregory Adams
*Assistant Examiner* — Lynn Schwenning
(74) *Attorney, Agent, or Firm* — Felix L. Fischer

(57) ABSTRACT

A maneuvering autonomous rotorcraft cargo attachment system for engaging two mating elements of a coupling mechanism includes a first system on a ship deck to position a first coupling mechanism element in response to positioning commands and a second system attached to a rotorcraft hoist cable to position the second coupling mechanism element in response to positioning commands. A controller calculates and issues the positioning commands to the first and second positioning systems thereby effecting engagement of the two coupling elements.

16 Claims, 24 Drawing Sheets

US 8,591,161 B1

MANEUVERING AUTONOMOUS ROTORCRAFT CARGO ATTACHMENT SYSTEM WITH MOTION COMPENSATION

BACKGROUND INFORMATION

1. Field

Embodiments of the disclosure relate generally to the field of cargo movement systems and more particularly to a cargo attachment system having a hoist cable mounted maneuvering body and a deck mounted positioning arm each including multiple axis motion capability an interactive positioning control for matching interconnection of a load suspension probe by the positioning arm with a catch receptacle in the maneuvering body.

2. Background

Rotorcraft are used extensively for offloading of ship borne cargo during sealift operations. The capability of rotorcraft to hover in close proximity to a ship with compensation for the motion of the ship allows hoist systems on the rotorcraft to be attached to deck mounted cargo on the ship, hoist the cargo from the deck and then fly the cargo to a desired drop point. However, motion of the ship and deck, particularly in severe weather or high seas, may exceed the capability of even skilled rotorcraft pilots and crew to locate and maintain end grapples on the hoist in position for attachment to slings or other connection points on cargo to be lifted from the deck. Additionally, manual attachment of hoist grapples to the cargo by deck personnel can be hazardous and excessive deck motion can exacerbate the potential for injury during cargo hook-up.

It is therefore desirable to provide a system for automated interconnection of the rotorcraft hoist system and the cargo to be lifted to reduce risk and enhance transfer success.

SUMMARY

Embodiments disclosed herein provide a maneuvering autonomous rotorcraft cargo attachment system for engaging two mating elements of a coupling mechanism. A first system on a ship deck positions a first coupling mechanism element in response to positioning commands and a second system attached to a rotorcraft hoist cable positions the second coupling mechanism element in response to positioning commands. A controller calculates and issues the positioning commands to the first and second positioning systems thereby effecting engagement of the two coupling elements.

In an example embodiment, the maneuvering autonomous rotorcraft cargo attachment system incorporates a positioning arm having actuators providing multiple degrees of freedom for positioning a suspension probe attached to a cargo load. A hoist cable mounted maneuvering system (HCMMS) with a catch receptacle adapted to receive the suspension probe has thrusters for lateral and rotational motion and a winch for vertical motion connected to a rotorcraft hoist. A controller includes a position sensor for determining differential position between the suspension probe and catch receptacle and actuator drivers for motion control of the actuators and thrusters responsive to the position sensor for engaging the suspension probe and catch receptacle.

The maneuvering autonomous rotorcraft cargo attachment system can also be included in a self contained shipping structure having a cargo container adapted to receive palletized loads with integral conveyors for disgorgement of each palletized load. The positioning arm is mounted to a telescoping track base connected to the cargo container.

A method for autonomous rotorcraft cargo attachment using the disclosed embodiments includes attaching the positioning arm on a ship deck to the suspension probe. Stacking support frames are then connected to a connection tree. A rotorcraft is brought to a stabilized hover over the ship deck and a HCMMS is deployed with a catch receptacle on a hoist cable using a cable winch. The HCMMS is actively positioned using winch extension and retraction to damp major vertical oscillations due to heave and pitch of the ship deck. Differential position of the suspension probe and catch receptacle is calculated and actuator thrusters on the HCMMS for lateral positioning and rotation gimbals on the positioning arm for vertical and horizontal position control of the claw carrying the suspension probe are activated to mate the suspension probe and catch receptacle.

The features, functions, and advantages that have been discussed can be achieved independently in various embodiments of the present disclosure or may be combined in yet other embodiments further details of which can be seen with reference to the following description and drawings.

DETAILED DESCRIPTION

Figure 1:
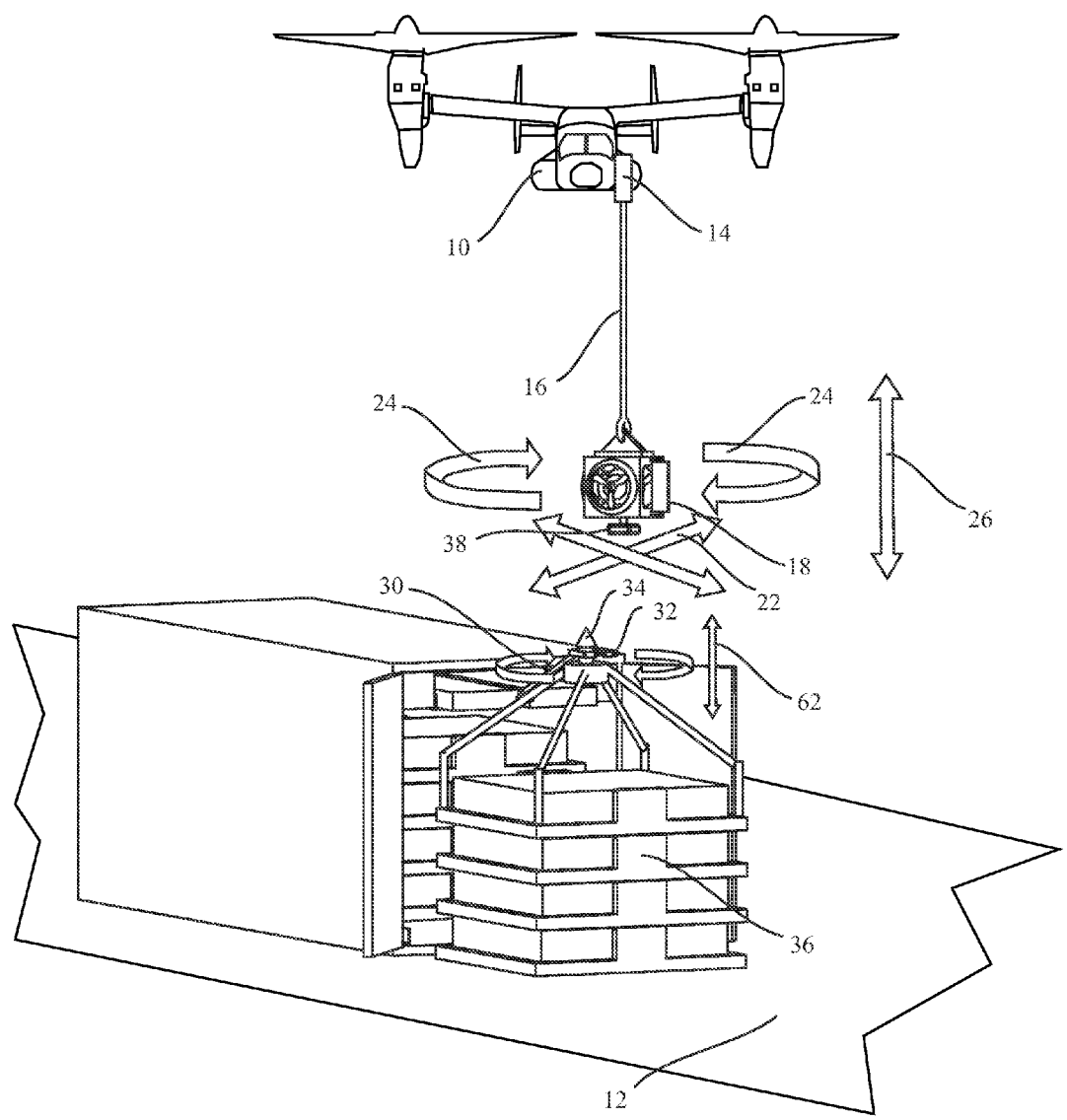
FIG. 1 is a pictorial view of an example embodiment for a maneuvering autonomous rotorcraft cargo attachment system showing the rotorcraft and ship deck elements of the system.

Embodiments disclosed herein provide a maneuvering autonomous rotorcraft cargo attachment system having rotorcraft and ship deck elements as shown in FIG. 1. Rotorcraft 10 is employed for movement of cargo from a ship deck 12. The rotorcraft 10 incorporates a hoist system having a winch 14 with cable 16. A hoist cable mounted maneuvering system (HCMMS) 18 is attached to grapple 20 on the hoist cable. As will be described in greater detail subsequently, the HCMMS 18 is self powered for lateral motion along axis 22 and rotational motion represented by arrows 24 about a vertical axis 26 defined by the hoist cable itself. The HCMMS is movable vertically along the vertical axis 26 by extension and retraction of the hoist cable either through the winch 14 or, in alternative embodiments, a secondary winch within the HCMMS itself or a combination of the two. Rotational motion of the HCMMS alters the alignment of the lateral axis 22 allowing the HCMMS to be positioned with 4 degrees of freedom.

On the ship deck 12 a positioning arm 30, which will be described in greater detail subsequently, provides up to six degrees of freedom for positioning a claw connector 32 which engages a suspension probe 34 which is attached to a palletized load 36 to be transported by the rotorcraft. A communication interface between the HCMMS and the positioning arm provides relative position information between the suspension probe 34 and a catch receptacle 38 in the HCMMS. The suspension probe 34 and catch receptacle 38 provide the mating moieties of the coupling mechanism for transporting the load. A control system, to be described in greater detail subsequently, provides mutual guidance for actively positioning the HCMMS 18 and the positioning arm 30 to insert and capture the suspension probe 34 within the catch receptacle 38. In alternative embodiments, the HCMMS may employ a hook or loop and the palletized load may employ an opposing loop or hook as the mating moieties of the coupling mechanism.

Figure 2:
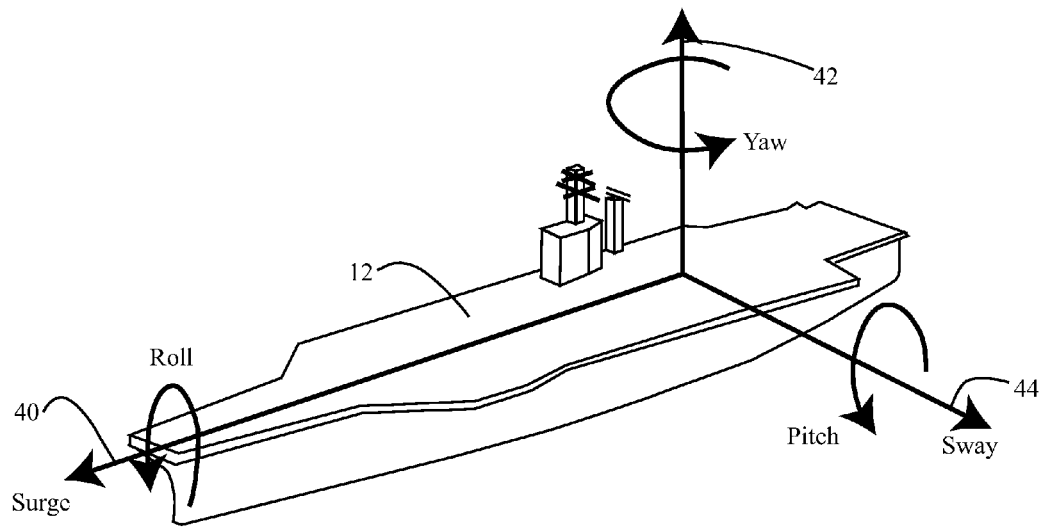
FIG. 2 is a depiction of ship motion for definition of terminology used.

FIG. 2 provides a pictorial reference with respect to the definition of ship motion. The ship 12 has a longitudinal axis 40 from stern to bow. The ship rolls about the longitudinal axis and surges along the axis. A perpendicular vertical axis 42 defines vertical motion of the ship, heave, and rotation about that vertical axis is termed yaw. Similarly, a lateral axis 44 orthogonal to the longitudinal and vertical axes defines pitch as rotation about the lateral axis and sway as lateral motion along the axis. Accurate relative positioning of the HCMMS to capture the ship board suspension probe requires compensation for all six motions; surge, roll, heave, yaw, pitch and sway.

Compensation for large vertical displacement of the suspension probe due to heave, pitch or roll of the ship is accommodated by retraction or extension of the hoist cable 16. In many cases, these motions will be periodic in nature allowing a matching motion to be established by the control system for gross positioning with the rotorcraft in a steady hover. Fine adjustment of the relative position of the suspension probe and catch receptacle can then be accomplished by the HCMMS 18 and positioning arm 30.

Figure 3:
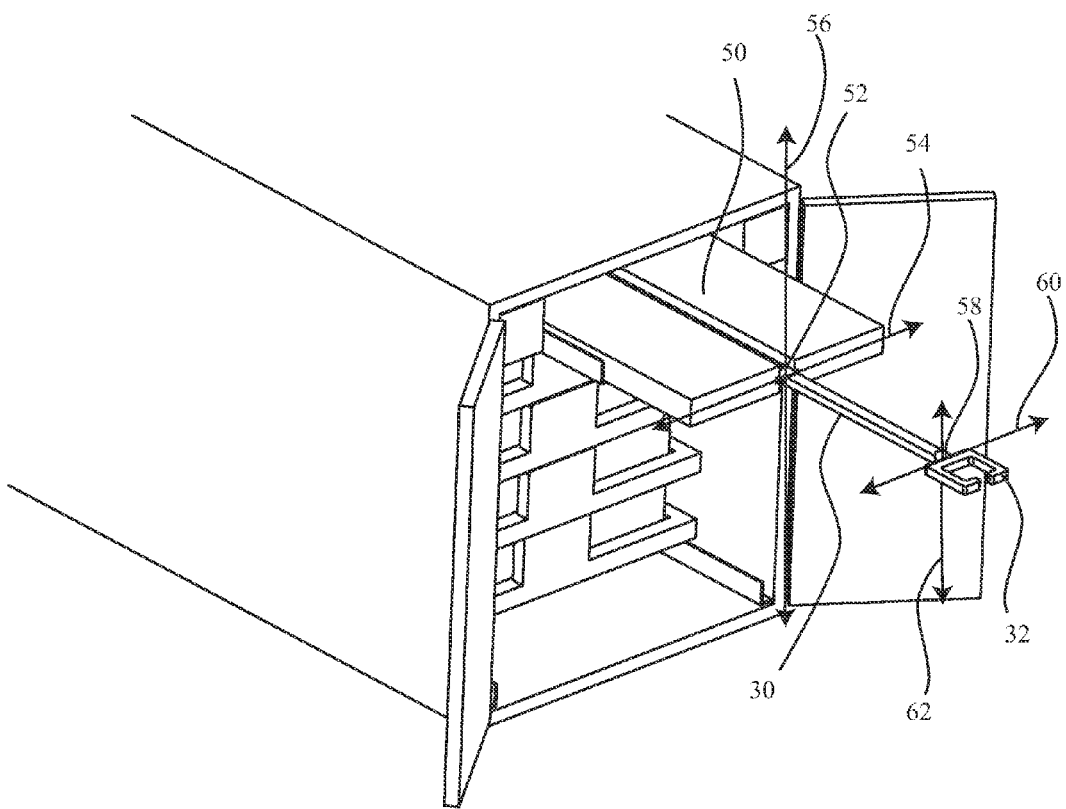
FIG. 3 is an isometric view of the ship deck mounted positioning arm.

Shown in FIG. 3, the positioning arm 30 terminates in a claw 32 for grasping the suspension probe. For the embodiment shown, the positioning arm is supported from a track base 50 which may be mounted to the ship or integral to a shipping container as will be described in greater detail subsequently. The positioning arm is connect to the track base with a gimbal 52 for rotation about a first axis 54 to raise and lower the positioning arm and a second axis 56 to laterally displace the claw end of the positioning arm. In certain embodiments, the arm is telescoping for additional positioning control. Attachment of the claw 32 to the positioning arm 30 with a second gimbal 58 allows the claw to be oriented about two axes 60 and 62 to position the suspension probe.

Figure 4A:
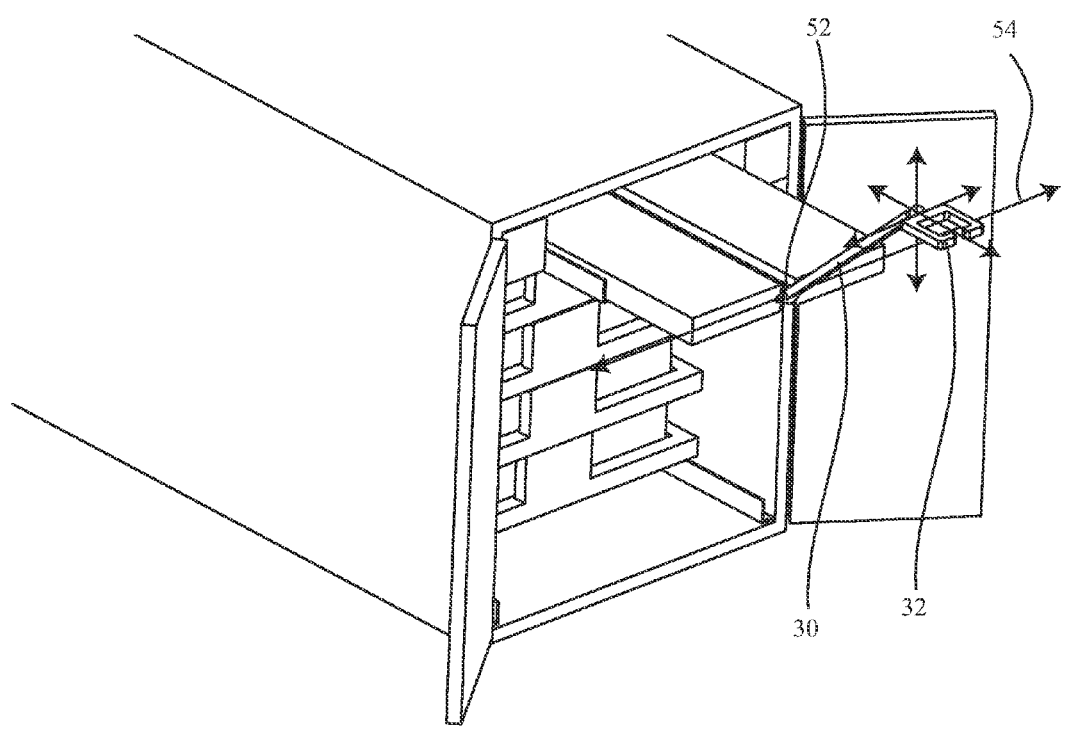
FIGS. 4A-4E show operational mobility of the positioning arm.
Figure 4B:
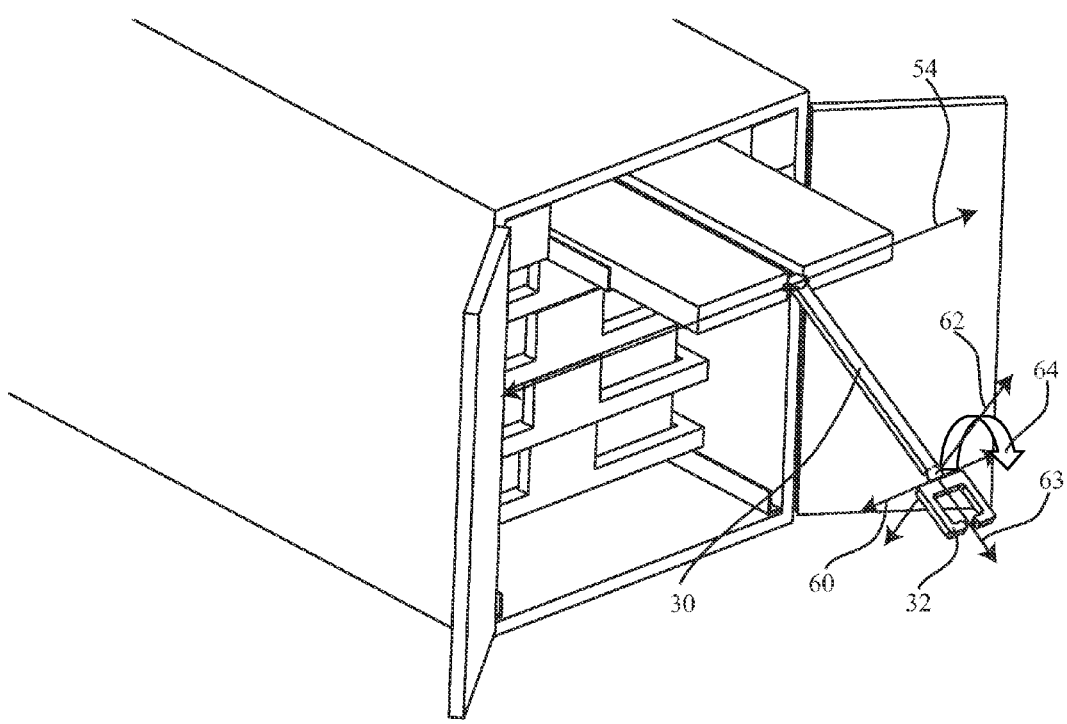
Figure 4C:
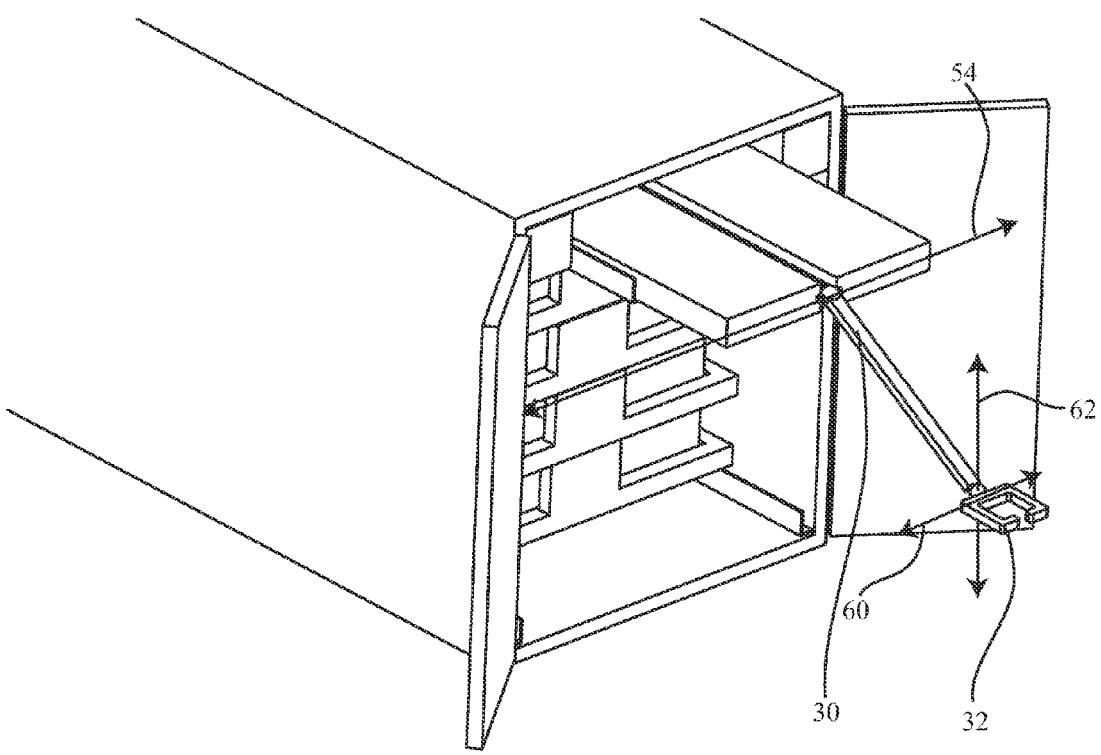
Figure 4D:
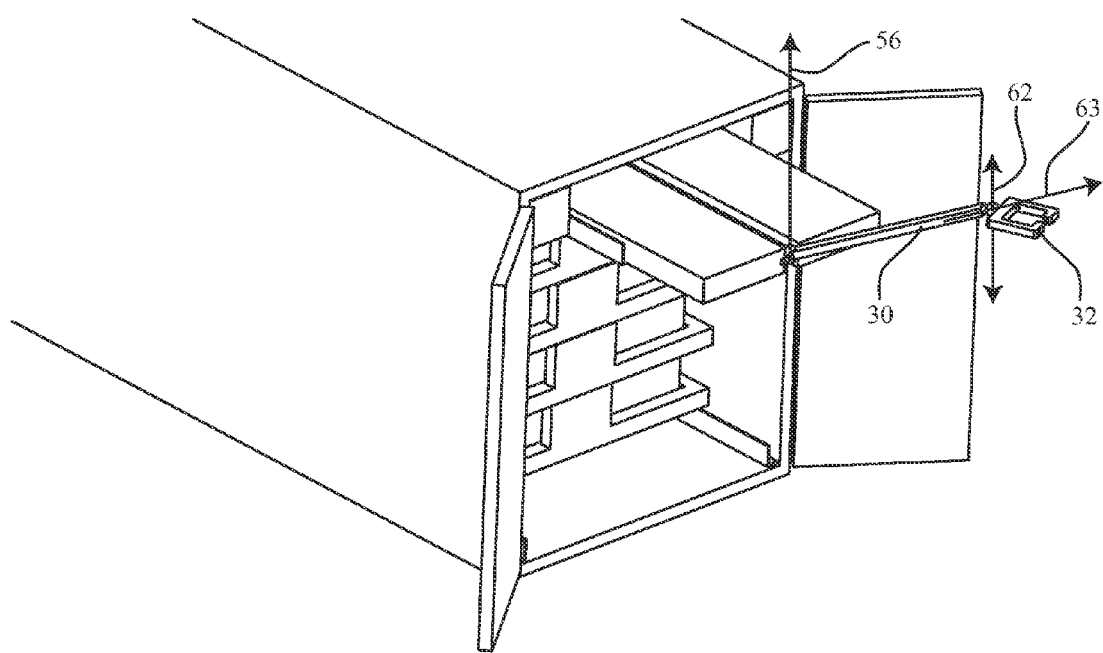
Figure 4E:
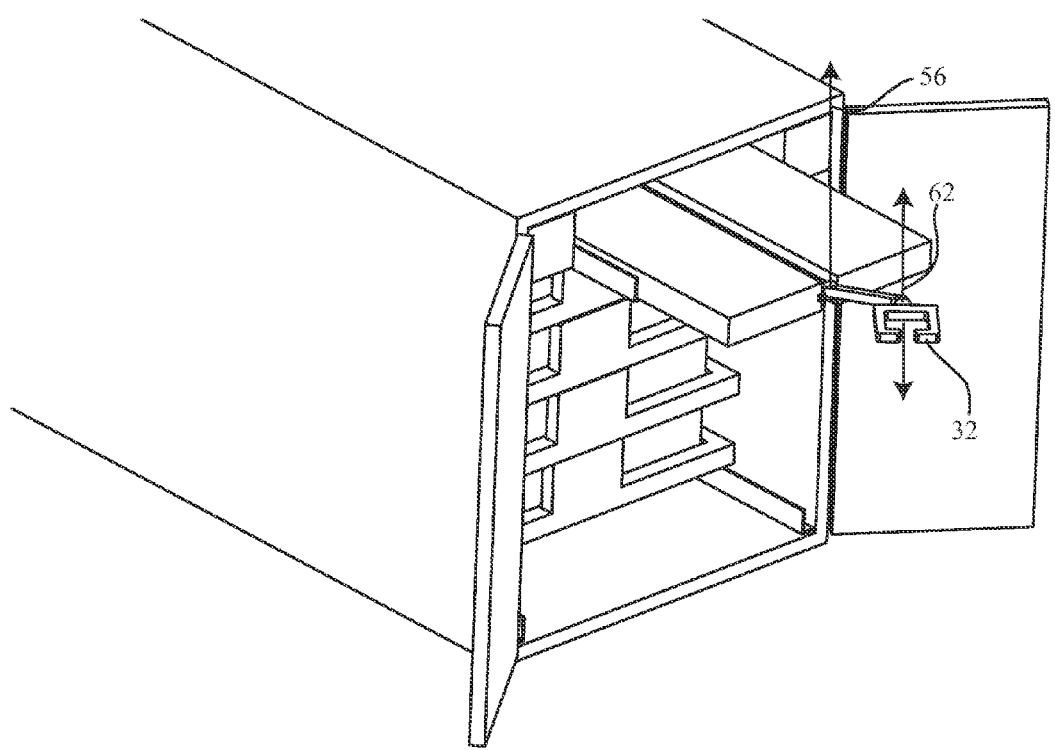

As shown in FIGS. 4A through 4C rotation of the positioning arm 30 about axis 54 provides vertical motion of the claw 32. As shown in FIG. 4B, rotation of the claw about axis 60 as represented by arrow 64 allows angular adjustment of the claw 32 with respect to the positioning arm 30. As shown in FIGS. 4D and 4E, rotation of the positioning arm about axis 56 and rotation of the claw about axis 62 allows lateral positioning of the claw 32. The second gimbal may also be rotatable on the axis 63 of the positioning arm. Actuators associated with the gimbals 52 and 58 may be electromechanical, hydraulic or pneumatic. In certain embodiments, the claw gimbal and position arm gimbal may be interconnected by a pantograph linkage in one or more axes for a stabilized positioning of the claw.

Figure 5:
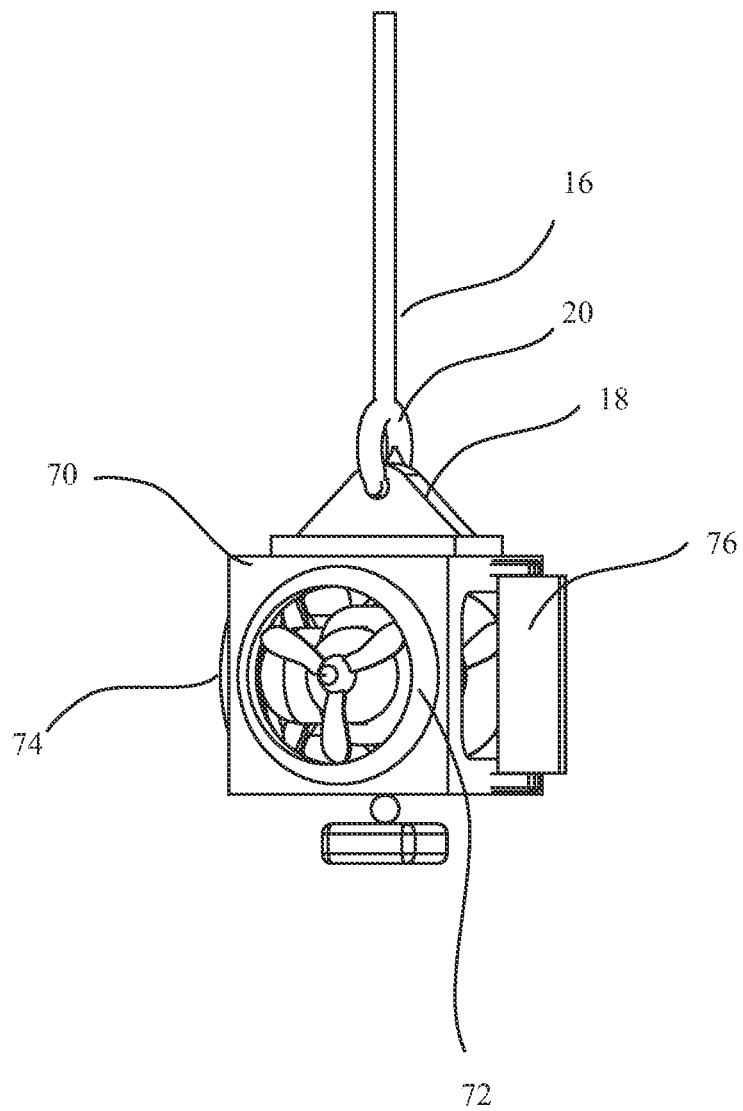
FIG. 5 is an isometric view of the hoist cable mounted maneuvering system.
Figure 6A:
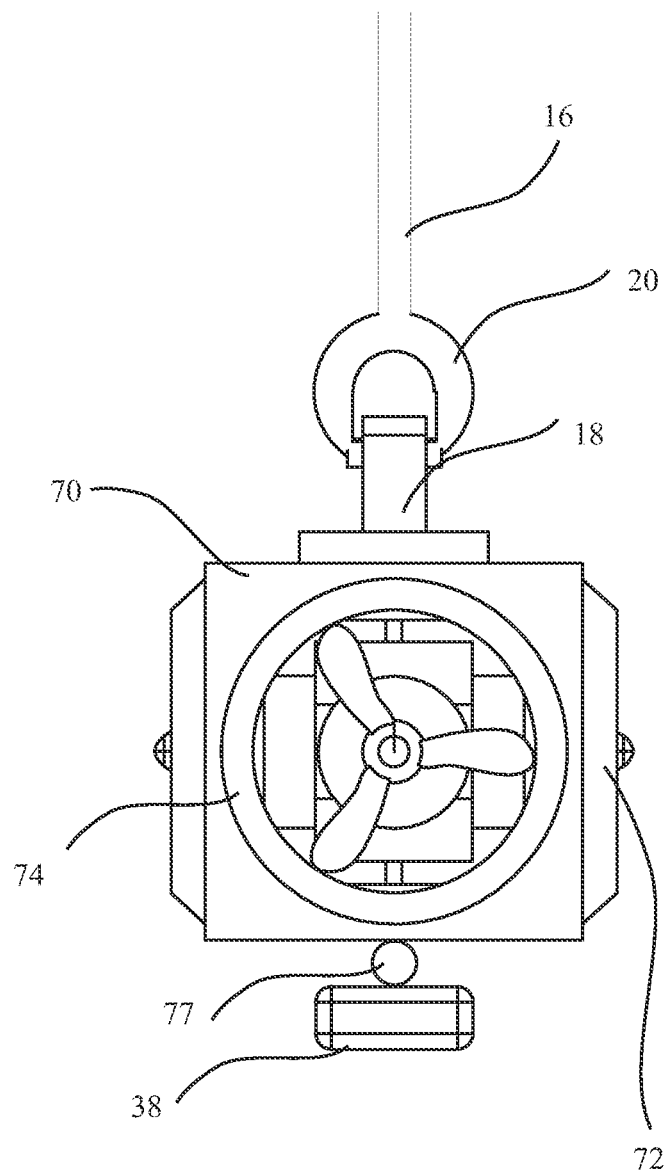
FIGS. 6A and 6B are front and side views of the hoist cable mounted maneuvering system.
Figure 6B:
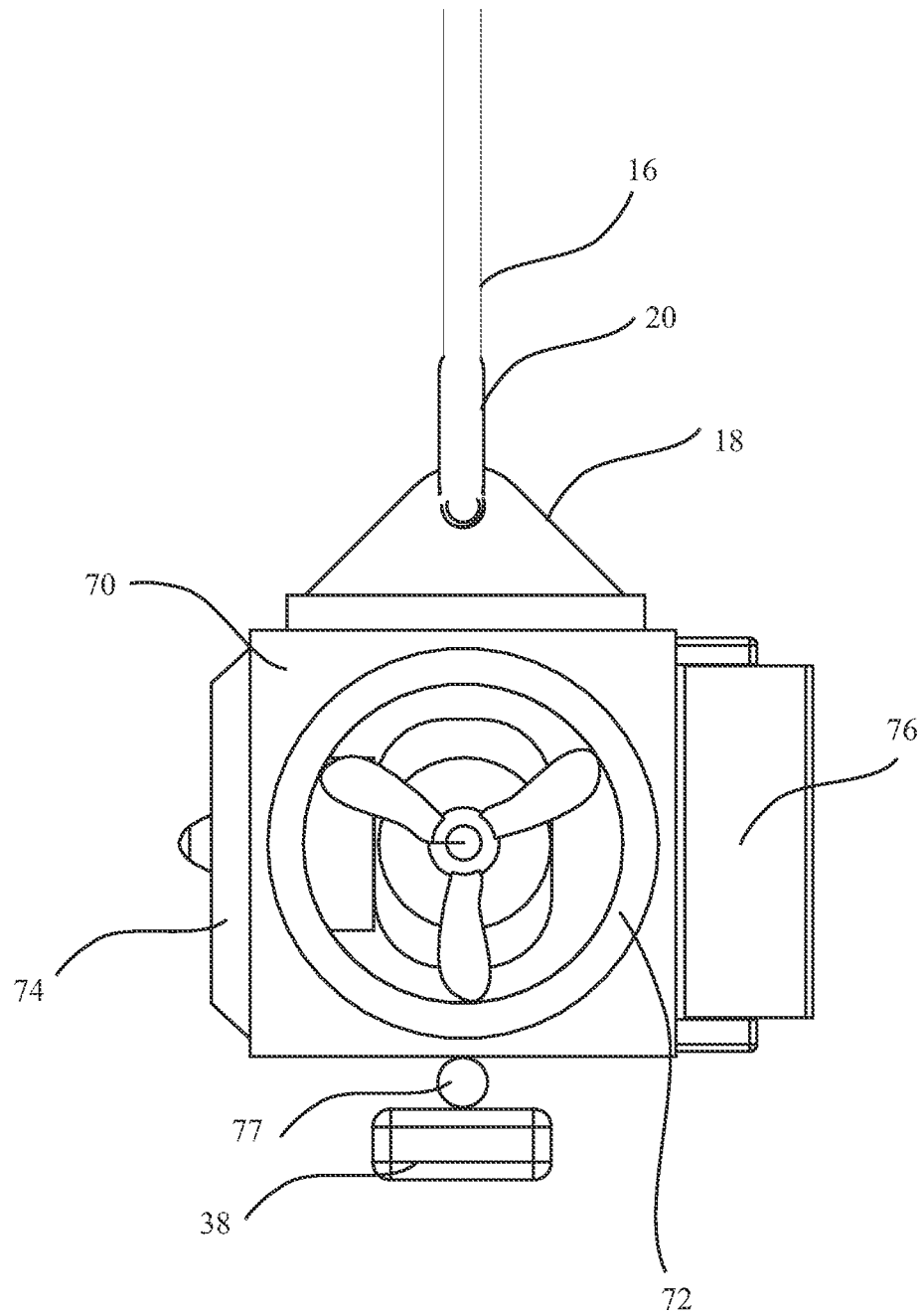
Figure 6C:
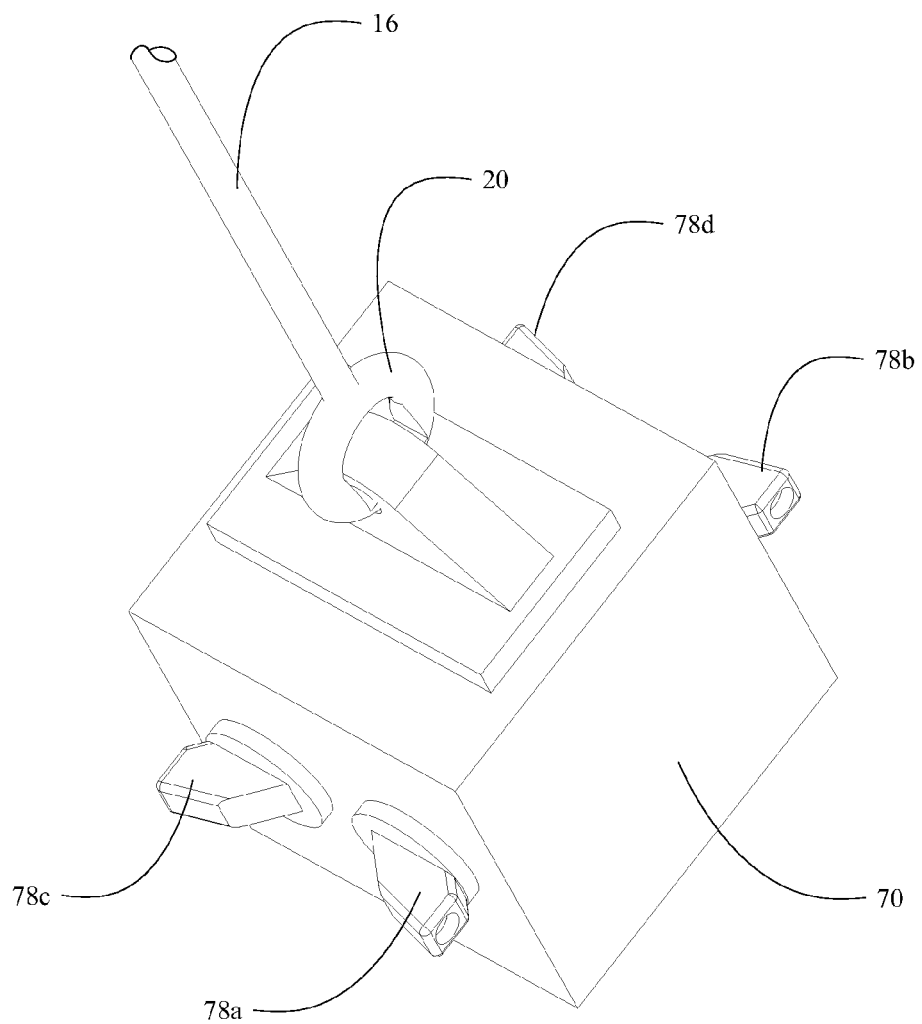
FIG. 6C is an isometric view of an alternative embodiment of the hoist cable mounted maneuvering system.

The HCMMS 18 is shown in detail in FIGS. 5, 6A and 6B. A substantially rectangular frame 70 is suspended from the grapple 20 on the hoist cable 16. For the embodiment shown, shrouded fans 72 are located on each side of the frame to act a thrusters providing lateral motion control for the HCMMS. The fans may operate individually for separate motion in opposite directions or, with reversible pitch blading, may operate in concert for motion in both directions. In alternative embodiments, a single fan with reversible pitch blading may be employed for lateral motion in both directions. A front fan 74 provides longitudinal motion control for the HCMMS and also provides airflow for reaction by a rudder 76 to rotate the HCMMS. A rear fan may be employed in certain embodiments. The catch receptacle 38 may be mounted with a gimbal 77 in the HCMMS providing rotation about a fore/aft longitudinal axis and a lateral axis relative to the frame to allow a full six degrees of freedom for orientation of the catch receptacle as carried in the HCMMS. In an alternative embodiment, gimbal mounting of the fans for rotation about a vertical axis provides differential thrust capability allowing elimination of the rudder. Gyroscopic effects of the fans may provide additional stabilization of the HCMMS. FIG. 6C shows an alternative embodiment with reaction jets 78a, 78b, 78c and 78d as the thrusters which may be employed in pairs to create lateral, longitudinal and rotational motion of the HCMMS. Activation of jets 78a and 78b propels the HCMMS longitudinally forward while activation of jets 78c and 78d propels the HCMMS longitudinally rearward. Similarly, activation of jets 78a and 78d propel the HCMMS laterally in a first direction while activation of jets 78b and 78c propel the HCMMS laterally in the opposite direction. Activation of jets 78a and 78c or 78b and 78d provide clockwise or counterclockwise rotation of the HCMMS. The jets may employ compressed gas stored in tanks in the HCMMS with or without an onboard compressor or may employ reactive propellants for jet generation.

Figure 7:
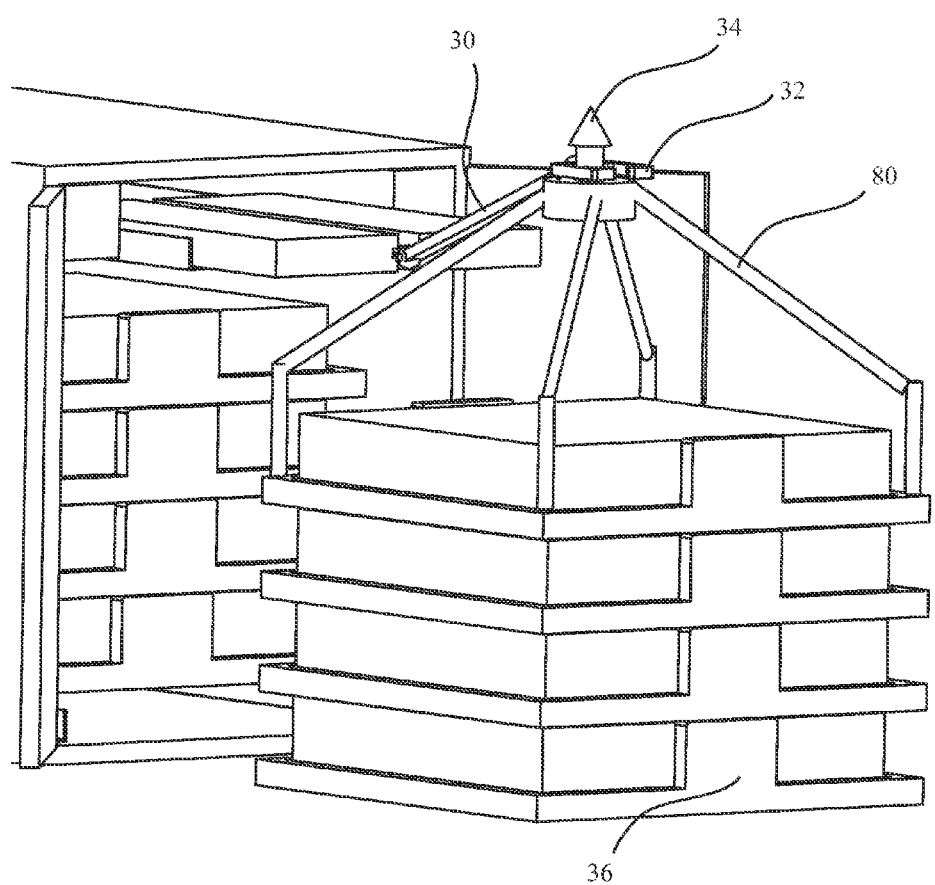
FIG. 7 is an isometric view of the dividable pallet system for loads to be lifted and the adjustable load suspension probe.

Connection of the load to be hoisted is accomplished as shown in FIG. 7. Suspension probe 34 is attached to the palletized load 36 with a connection tree 80. For the embodiment in the drawings connection tree 80 is a pliant tubular structure, however, in alternative embodiments, straps or cables interconnecting the suspension probe and palletized load may be employed. Claw 32 grasps the suspension probe 34 for orientation by positioning arm 30 for connection to the HCMMS.

Figure 8A:
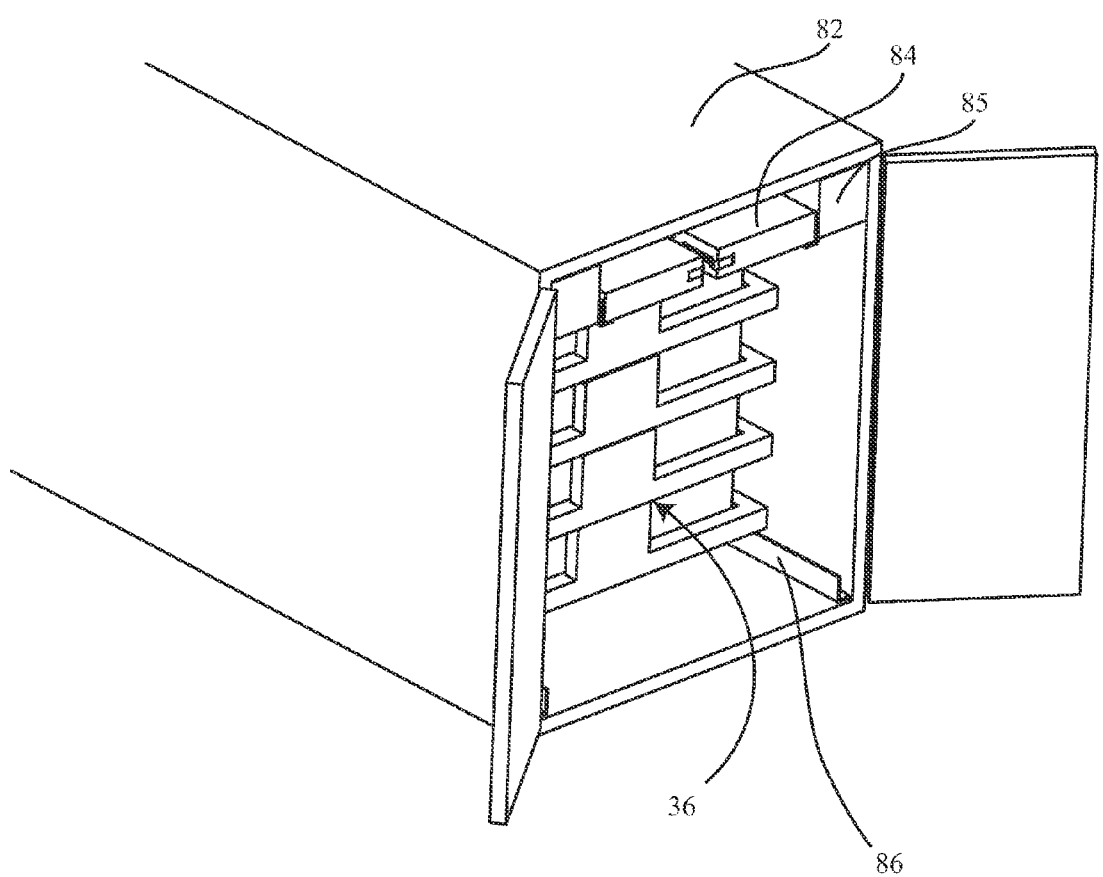
FIGS. 8A-8C are pictorial views of an modular shipping container system employing an integrated deck mounted positioning arm.
Figure 8B:
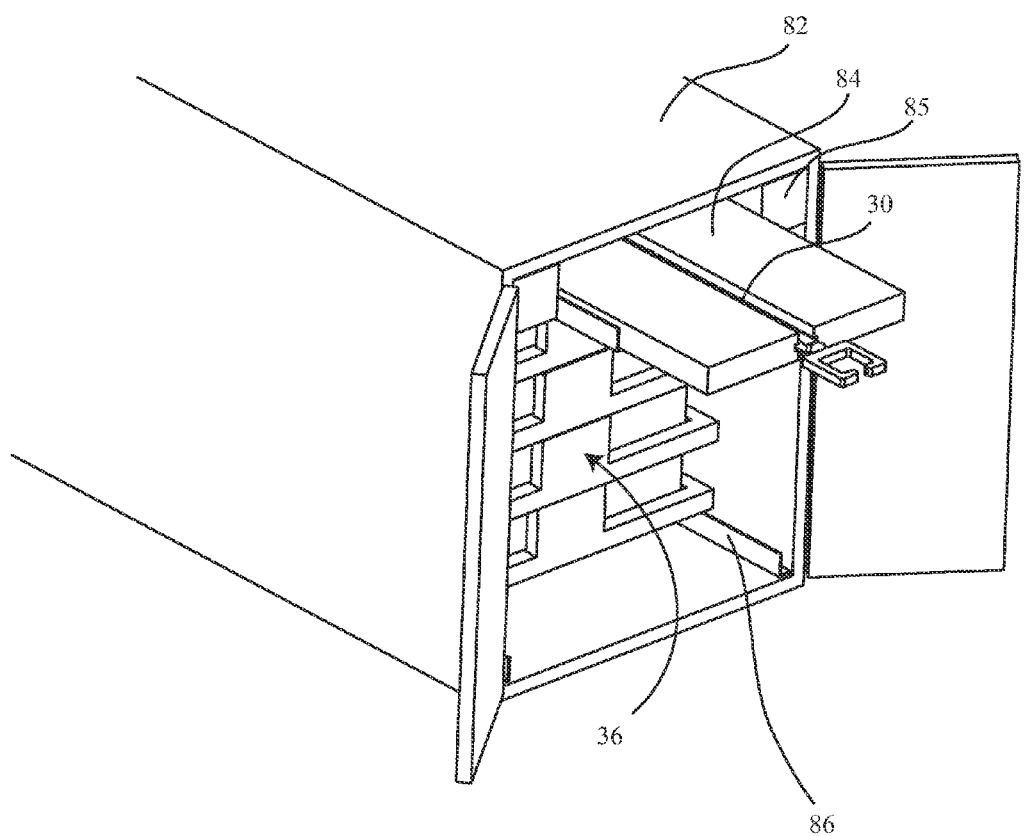
Figure 8C:
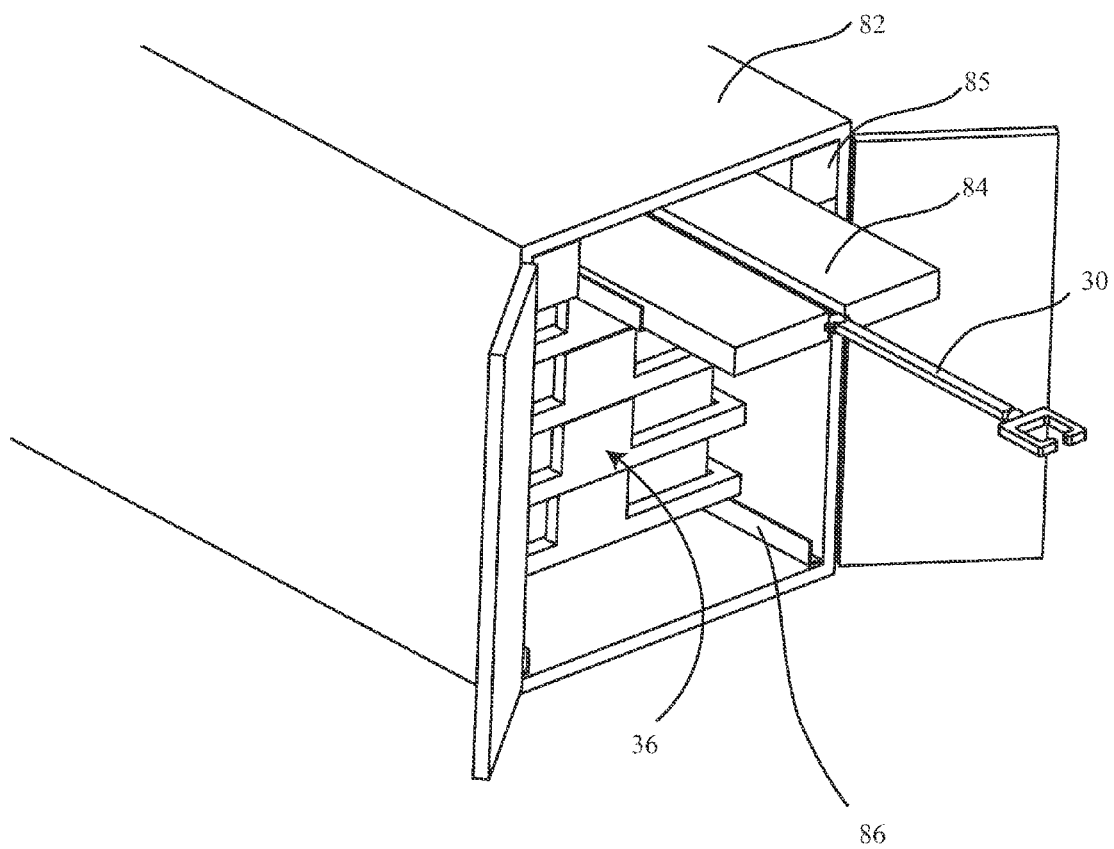
Figure 9:
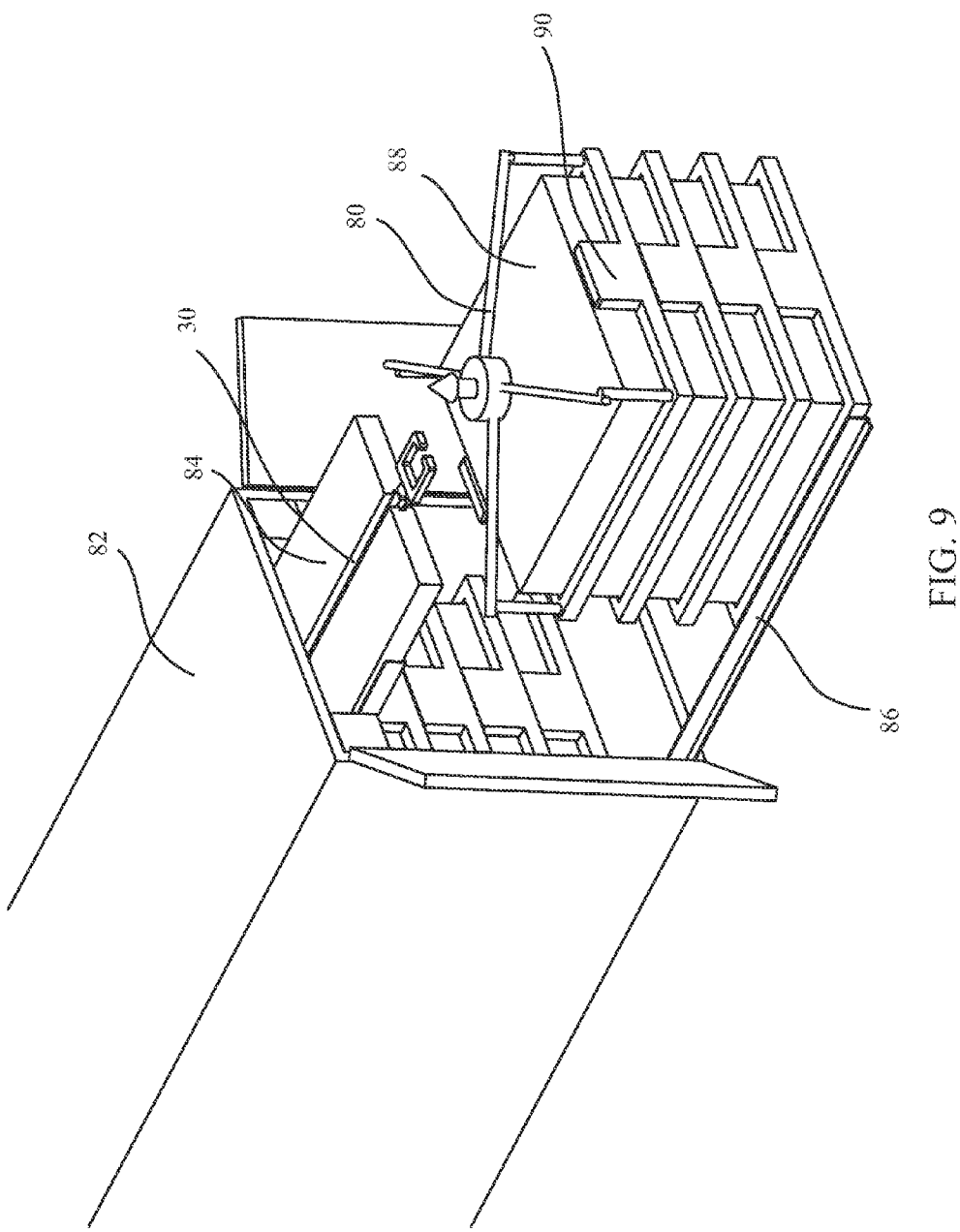
FIG. 9 is a pictorial view of the modular shipping container system with the integrated deck mounted positioning arm and a first dividable pallet deployed for interconnection with the hoist cable mounted maneuvering system by the positioning arm.

For an example embodiment, the shipboard elements of the system may be integrated into an automatable self contained shipping structure. As shown in FIGS. 8A-8C, a shipping container 82 (shown in phantom) houses multiple palletized loads 36. A ceiling mounted telescoping support track 84 attached to support structure 85 in the container is extendible to place the positioning arm 30 in an operational configuration. A floor conveyor or roller system 86 (which may be integral to the palletized load structure) allows the palletized loads to be disgorged from the shipping container. As shown in FIG. 9, the palletized load 36 may include multiple cargo elements 88 with individual stacking support frames 90. The connection tree 80 attaches to the support frames 90 for lifting.

Figure 10A:
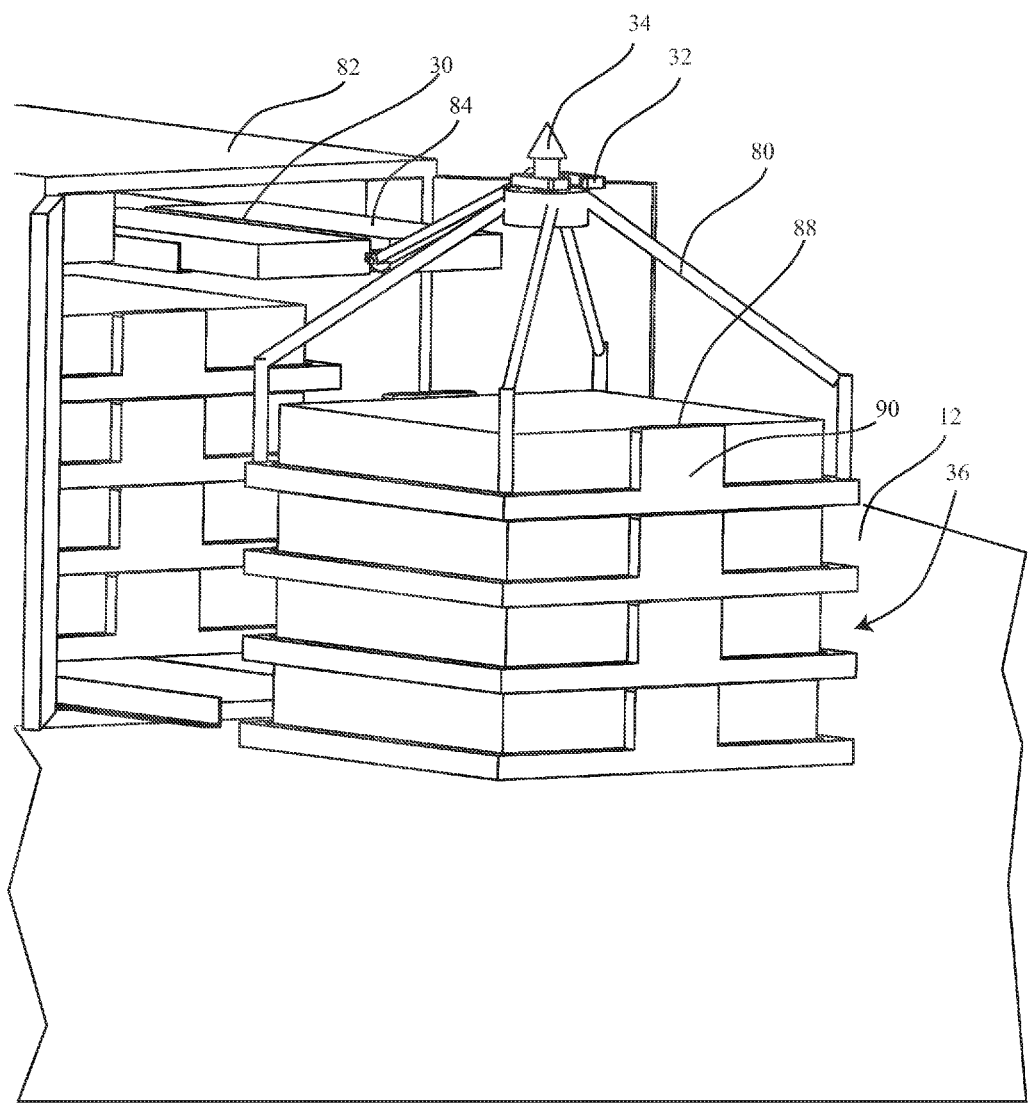
FIGS. 10A-10E show a deployment sequence by the modular shipping container system and the maneuvering autonomous rotorcraft cargo attachment system for movement of a dividable pallet at full load, with FIG. 10D shows an example of movement of the dividable pallet at partial load.
Figure 10B:
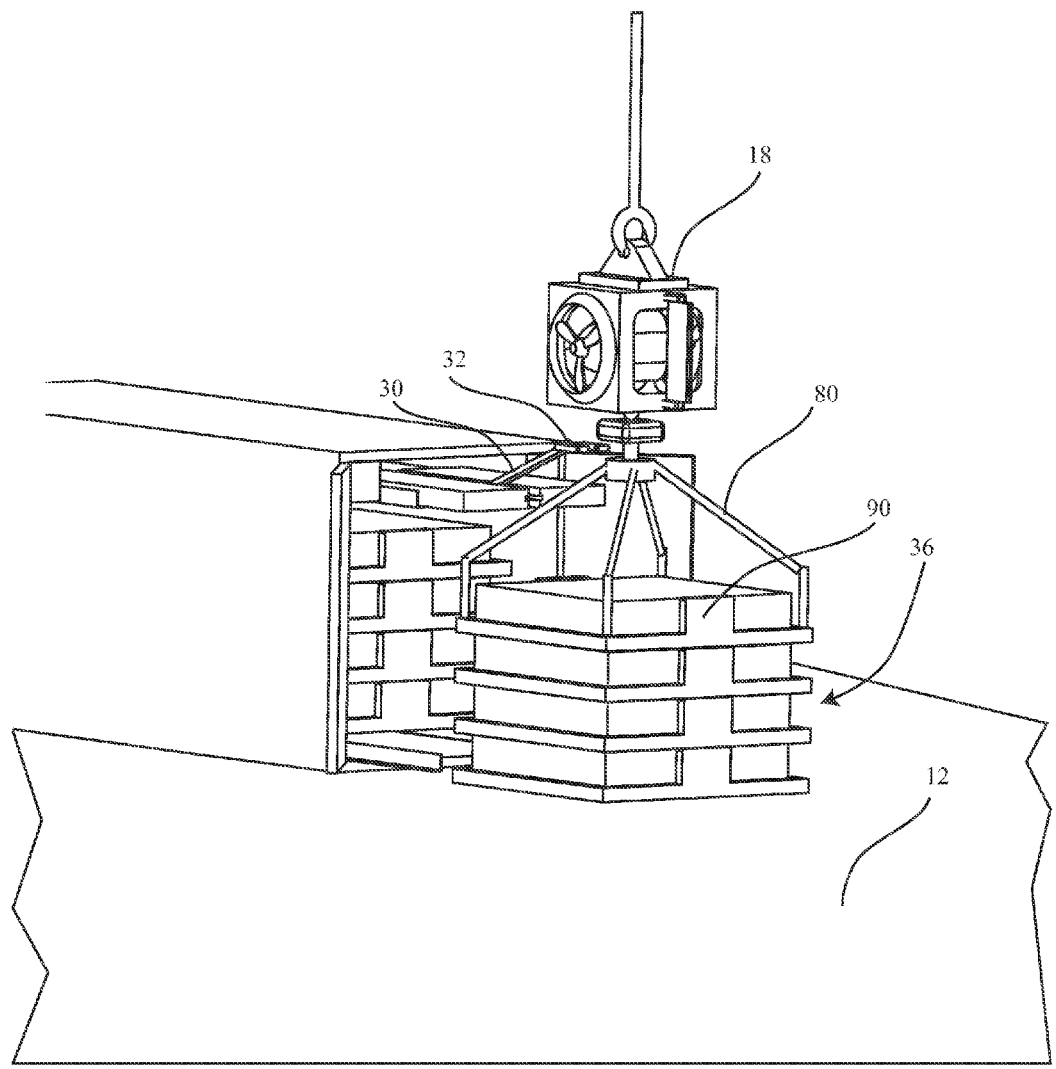
Figure 10C:
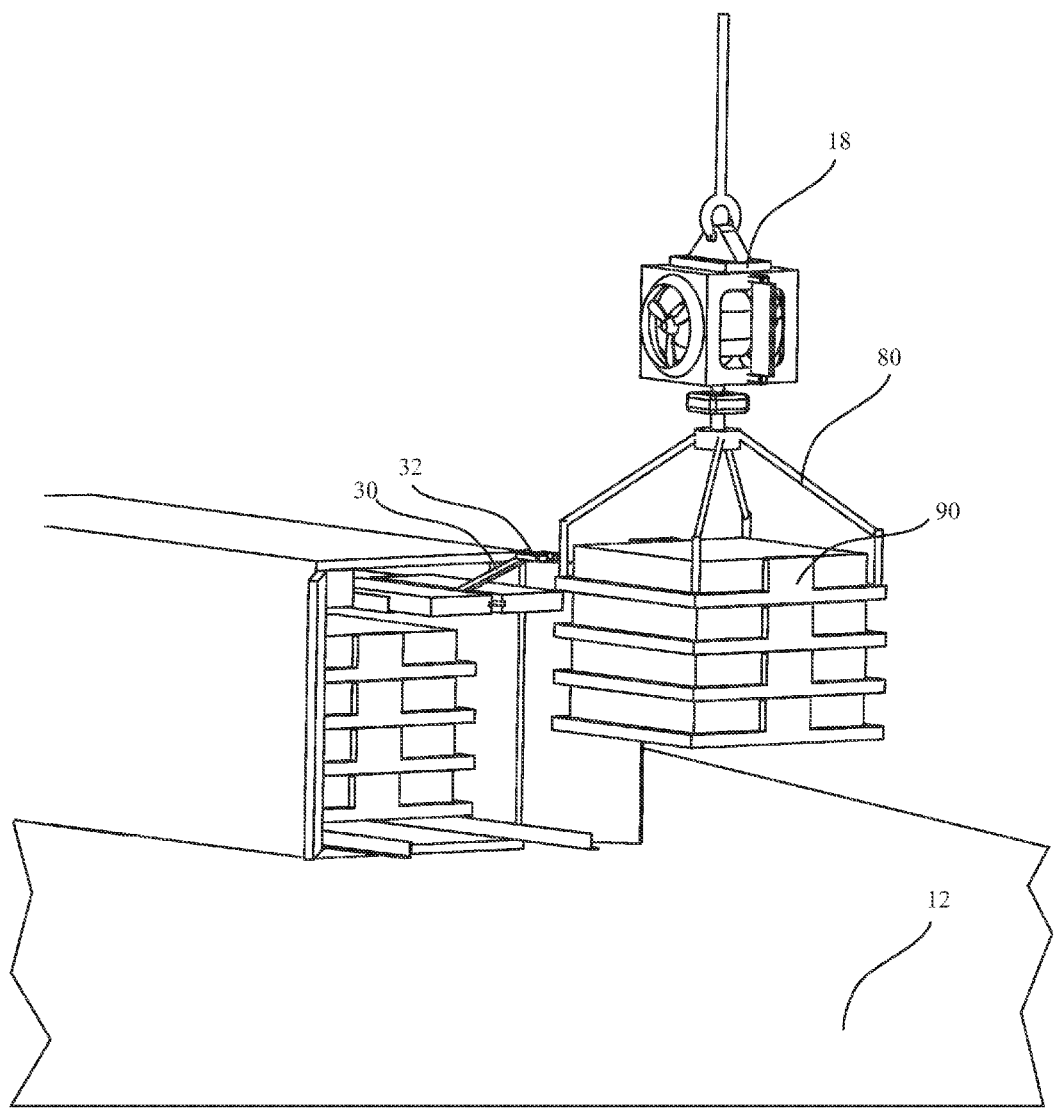
Figure 10D:
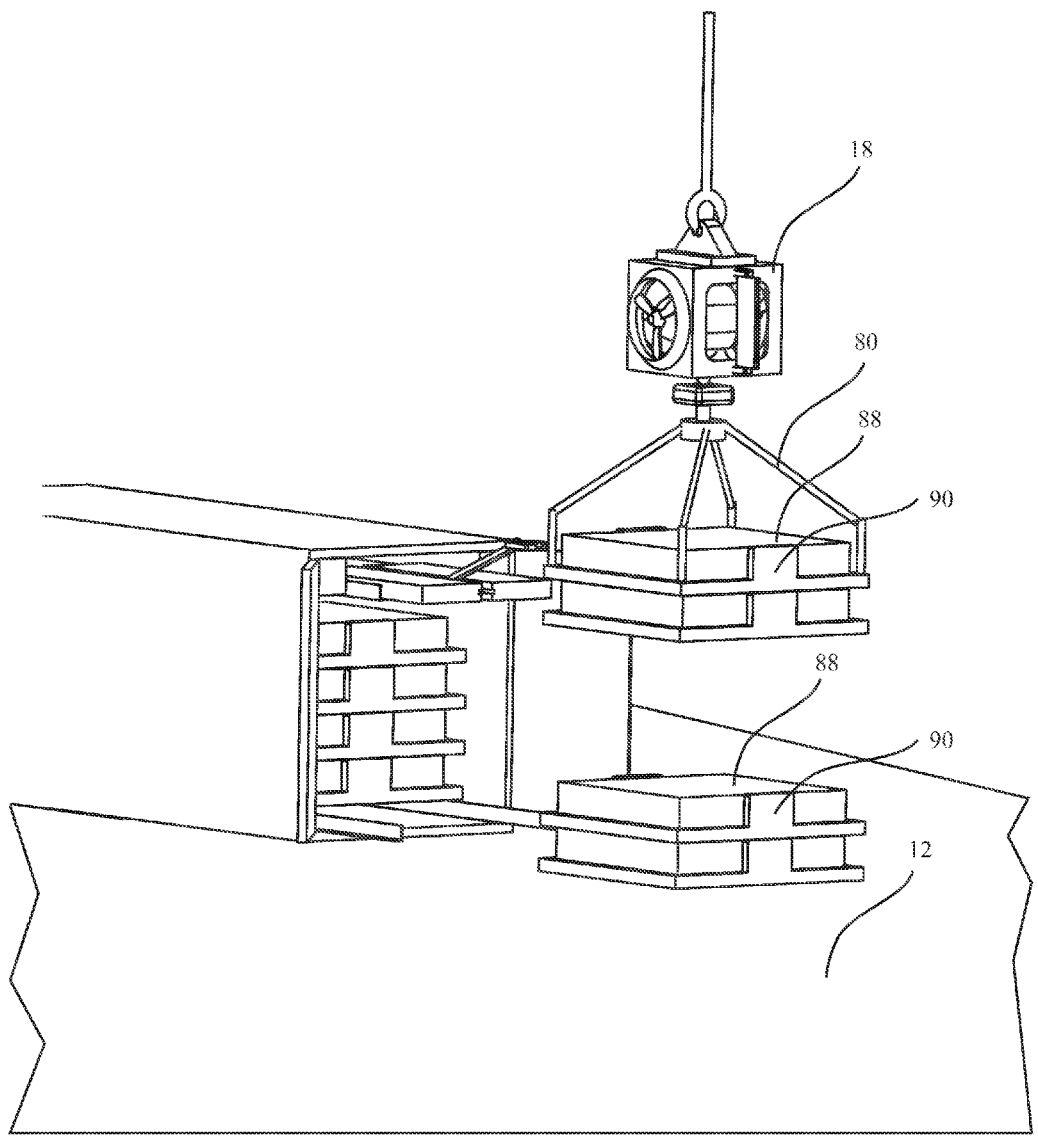
Figure 10E:
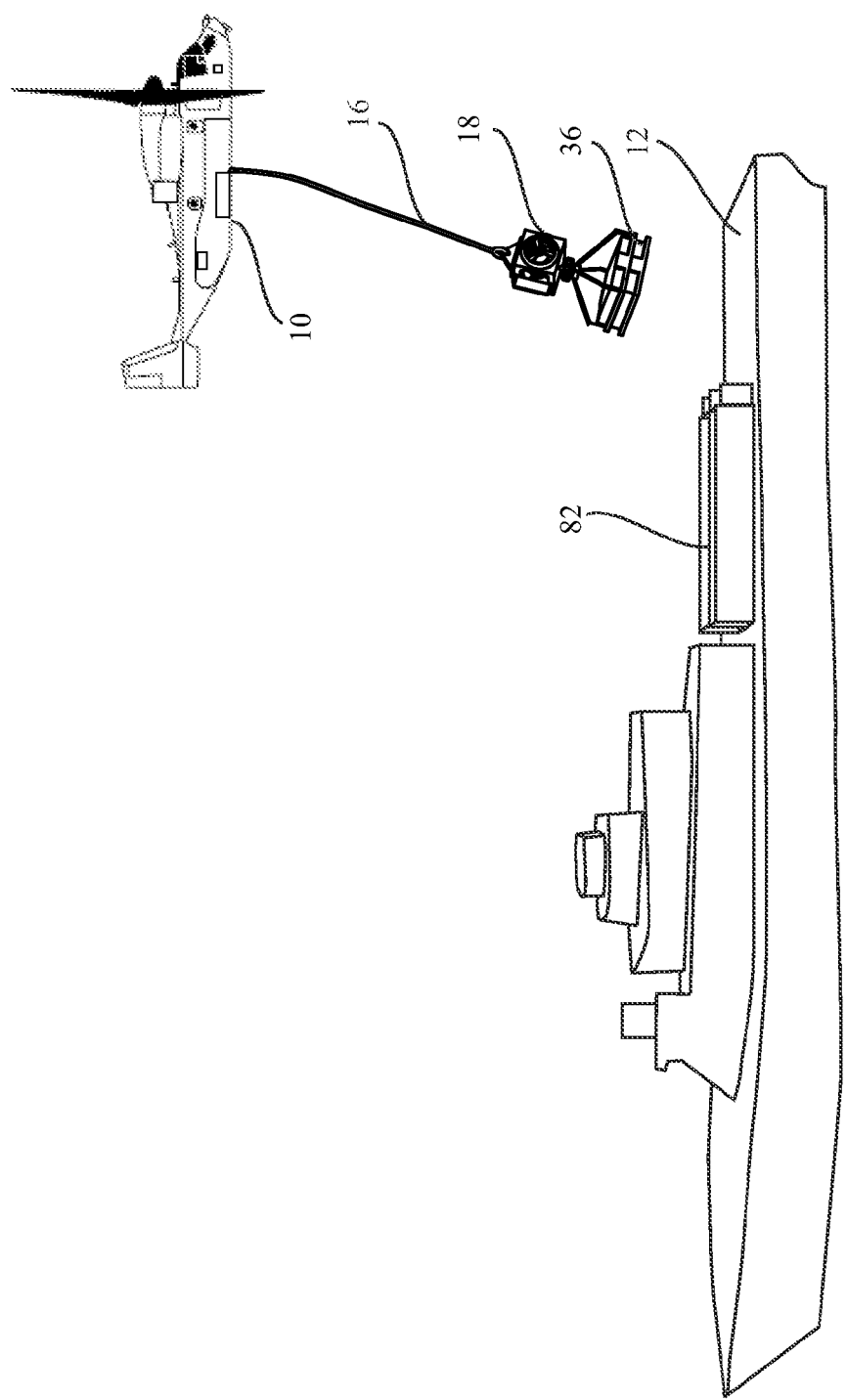

As shown in FIG. 10A, positioning arm 30 may be maneuvered to allow claw 32 to grasp the suspension probe 34. The HCMMS 18 and positioning arm 30 are then mutually maneuvered to interconnect the suspension probe and catch receptacle 38 as shown in FIG. 10B. In certain embodiments oppositely polarized permanent magnet or electromagnetic elements may be employed in the suspension probe and catch receptacle to enhance capture and interconnection. The claw 32 then releases the suspension probe and the rotorcraft may then lift the palletized load 36 from the ship deck 12 as shown in FIG. 10C. For the integrated shipping structure, the stacking support frames 90 which are connected to the connection tree may be selected for weight reasons or different delivery locations and only a portion of the initial palletized load 36 lifted by the rotorcraft as shown in FIG. 10D. After connection, the rotorcraft 10 may then transport the palletized load 36 to its desired destination as represented in FIG. 10E.

Figure 11:
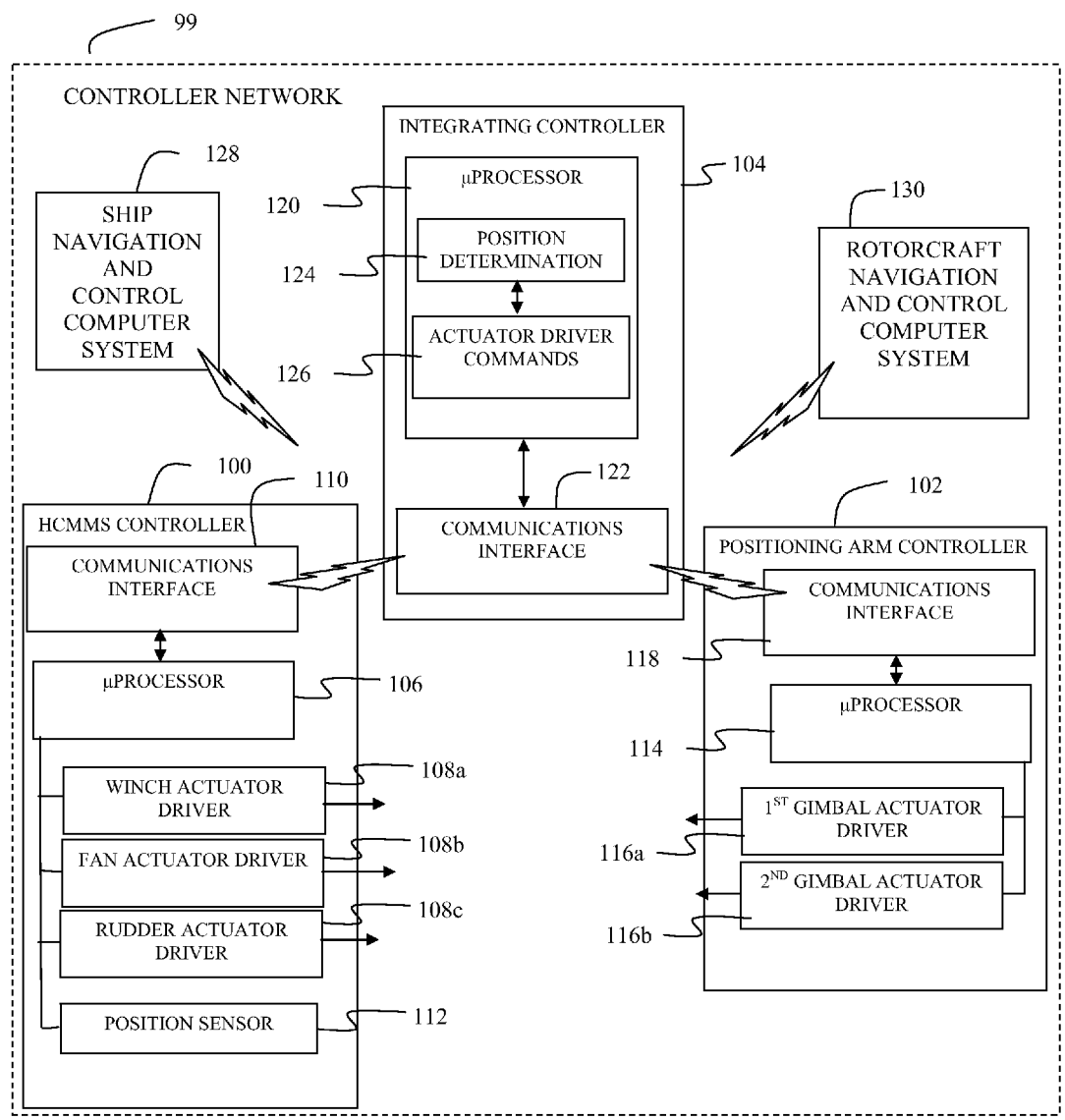
FIG. 11 is a block diagram of the control system elements for the embodiments described; and, FIG. 12 is a flow chart describing the operational method employing the maneuvering autonomous rotorcraft cargo attachment system.

As shown in FIG. 11, control of the HCMMS and positioning arm for interconnection of the suspension probe and catch receptacle may be accomplished by in a controller network 99 incorporating a first controller 100 associated with the HCMMS, a second controller 102 associated with the positioning arm and an integrating controller 104. First controller 100 incorporates a microprocessor 106 and actuator drivers 108a for hoist winch position, 108b for thrust from the fans and 108c for rudder control. A communications interface 110 provides interactive control communication with the integrating controller and/or the second controller. A position sensor element 112 determines relative position of the HCMMS with respect to the suspension probe. Second controller 102 incorporates a microprocessor 114 and actuator drivers 116a for first gimbal actuators on the position arm and 116b for the second gimbal actuators for the claw. A communications interface 118 provides interactive control communication with the integrating controller and/or the first controller.

The integrating controller 104 employs a microprocessor 120 and communications interface 122 for communication with the first and second controllers. Microprocessor 120 includes software modules 124 and 126 for determining relative position of the HCMMS and capture receptacle with respect to the suspension probe and issuing commands to the first and second controllers for mutual actuation control of the HCMMS positioning components and the positioning arm to collocate and connect the suspension probe and capture receptacle, respectively.

Ship guidance, navigation and control computer system 128 and rotorcraft guidance, navigation and control computer system 130 are interconnected in the system to complete the controller network 99 providing closed loop control at the large platform level. Wave motion sensing and ships position prediction systems in or connected to ship guidance, navigation and control computer system 128 may be employed by the controller network to better manage load connection and extraction from the deck. Placement of cargo on a receiving position on a deck can also be achieved with this system. Use of this system on the ground or on moving ground vehicles can also be useful. Additionally, the positioning arm may be integrally fixed to an object to be lifted, as examples without limitation, a boat, buoy or small submarine (manned or unmanned) for securing the suspension probe (also directly attached to the object with a flexible connection tree) in the catch receptacle of a rotorcraft mounted HCMMS. While shown as separate elements in a distributed architecture for the embodiment shown in the drawings, the functionality of the integrating controller may be incorporated within either the first or second controller and one or more or all of the controllers may be centralized and incorporated in the computer housing the ship guidance, navigation and control computer system 128 or rotorcraft guidance, navigation and control computer system 130.

Relative position sensing for the HCMMS and suspension probe may be accomplished in various embodiments using differential Global Positioning Systems (GPS) or quadrature shifted radio frequency (RF) position sensing.

Figure 12:
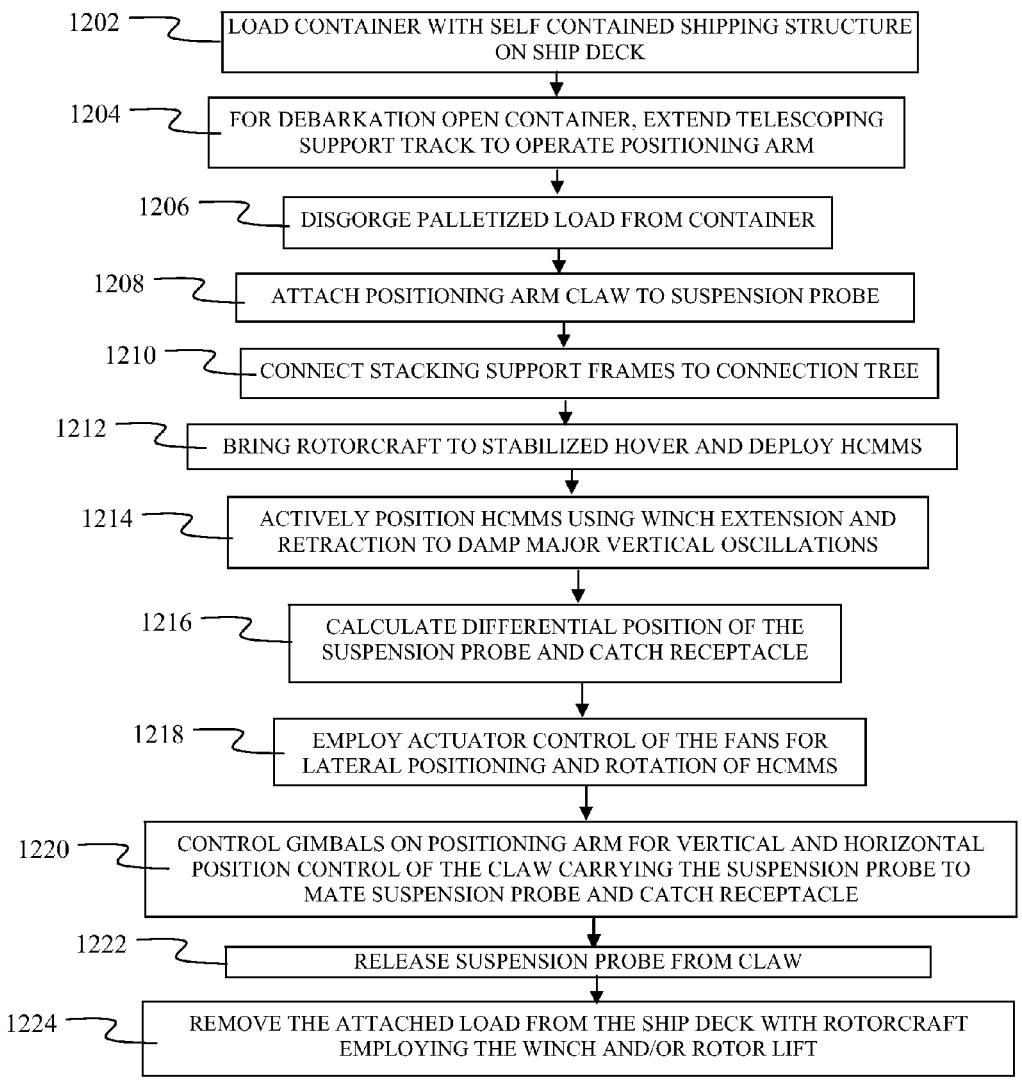

Operation of the maneuvering autonomous rotorcraft cargo attachment system including the integrated shipboard self contained shipping structure can be characterized as a method shown in FIG. 12. One or more containers incorporating the self contained shipping structure are loaded onto an accessible ship deck, step 1202. At a desired debarkation location, the container is opened and the telescoping support track is extended to initiate operation of the positioning arm, step 1204. A palletized load is then disgorged from the container, step 1206, and the claw on the positioning arm is attached to the suspension probe, step 1208. Based on weight or delivery considerations, individual stacking support frames are connected to the connection tree, step 1210. A rotorcraft is brought to a stabilized hover over the ship deck and the HCMMS is deployed on the hoist cable using the cable winch, step 1212. The HCMMS is actively positioned using winch extension and retraction to damp major vertical oscillations due to heave and pitch of the ship deck, step 1214. The control system the calculates differential position of the suspension probe and catch receptacle, step 1216, and employs actuator control of the fans on the HCMMS for lateral positioning and rotation, step 1218, and the actuator control of the gimbals on the positioning arm for vertical and horizontal position control of the claw carrying the suspension probe, step 1220, to mate the suspension probe and catch receptacle. The claw then releases the suspension probe, step 1222, and the rotorcraft, employing the winch and/or rotor lift may remove the attached load from the ship deck, step 1224, for transport to the delivery location. Extraction of the cargo after interconnect leverages the use of the large platform control awareness and the active systems to afford safe extraction timing augmented by the now modest thrusts applied by the system due to the cargo inertia.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A system for engaging a coupling mechanism for rotorcraft hoist connection comprising:
    a first system on a ship deck having an articulated arm capable of six degrees of motion for positioning a first coupling mechanism part in response to positioning commands;
    a second system attached to a rotorcraft hoist for positioning a second coupling mechanism part in response to positioning commands; and
    a controller network to calculate and issue positioning commands to said first and second positioning systems thereby effecting engagement of the first and second coupling mechanism parts.

2. The system defined in claim 1 wherein said first coupling mechanism part is a suspension probe and said second coupling mechanism part is a catch receptacle adapted to receive the suspension probe.

3. The system defined in claim 1 wherein said second positioning system incorporates thrust generators, actuators, and a winch capable of combined six degrees of motion.

4. A maneuvering autonomous rotorcraft cargo attachment system comprising:
   a positioning arm having actuators providing multiple degrees of freedom for positioning a suspension probe attached to a cargo load, said positioning arm terminating in a claw for grasping the suspension probe and incorporating a first gimbal for elevation and azimuth positioning of the claw;
   a hoist cable mounted maneuvering system (HCMMS) with a catch receptacle adapted to receive the suspension probe, said HCMMS having thrusters for lateral and rotational motion and a winch for vertical motion connected to a rotorcraft hoist;
   a controller including
      a position sensor for determining differential position between the suspension probe and catch receptacle; and
      actuator drivers for motion control of the actuators and thrusters responsive to the position sensor for engaging the suspension probe and catch receptacle.

5. The maneuvering autonomous rotorcraft cargo attachment system as defined in claim 4 wherein the positioning arm further includes a second gimbal for articulation of the claw.

6. The maneuvering autonomous rotorcraft cargo attachment system as defined in claim 5 wherein the second gimbal is rotatable about an axis of the positioning arm.

7. The maneuvering autonomous rotorcraft cargo attachment system as defined in claim 4 wherein the positioning arm is mounted to a track base.

8. The maneuvering autonomous rotorcraft cargo attachment system as defined in claim 7 wherein the track base is telescopically mounted in a shipping container.

9. The maneuvering autonomous rotorcraft cargo attachment system as defined in claim 4 wherein the HCMMS comprises:
   a substantially rectangular frame suspended from a grapple on the hoist cable;
   the thruster for lateral motion comprises at least one fan mounted in a side of the frame; and,
   the thruster for rotational motion comprises at least one fan mounted in a front of the frame and a rudder mounted on the frame in the slipstream of the front mounted fan.

10. The maneuvering autonomous rotorcraft cargo attachment system as defined in claim 4 wherein the HCMMS employs jets positioned for differential thrust as the thrusters.

11. The maneuvering autonomous rotorcraft cargo attachment system as defined in claim 4 wherein the controller comprises:
   at least one microprocessor having software modules for differential position calculation responsive to the position sensor and actuator driver commands for thruster, winch and actuator control response to the differential position calculation;
   at least one communications interface for position sensor data and actuator driver command exchange between the controller, the HCMSS and the positioning arm.

12. A self contained shipping structure and autonomous rotorcraft cargo attachment system comprising:
   a cargo container adapted to received palletized loads with integral conveyors for disgorgement of each palletized load;
   a positioning arm mounted to a telescoping track base connected to the cargo container, said positioning arm having actuators providing multiple degrees of freedom for positioning a suspension probe attached to the palletized load, the palletized load connected to the suspension probe with a connection tree;
   a hoist cable mounted maneuvering system (HCMMS) with a catch receptacle adapted to receive the suspension probe, said HCMMS having thrusters for lateral and rotational motion and a winch for vertical motion connected to a rotorcraft hoist;
   a controller including
      a position sensor for determining differential position between the suspension probe and catch receptacle; and
      actuator drivers for motion control of the actuators and thrusters responsive to the position sensor for engaging the suspension probe and catch receptacle.

13. The self contained shipping structure and autonomous rotorcraft cargo attachment system as defined in claim 12 wherein each palletized load incorporates a plurality of stacking support frames each carrying a cargo element, said stacking support frames selectively attachable to the connection tree.

14. A method for autonomous rotorcraft cargo attachment comprising:
   attaching a positioning arm on a ship deck to a suspension probe;
   connecting stacking support frames to a connection tree;
   bringing a rotorcraft to a stabilized hover over the ship deck;
   deploying a HCMMS with a catch receptacle on a hoist cable using a cable winch;
   actively positioning the HCMMS using winch extension and retraction to damp major vertical oscillations due to heave and pitch of the ship deck;
   calculating differential position of the suspension probe and catch receptacle;
   controlling actuator thrusters on the HCMMS for lateral positioning and rotation gimbals on the positioning arm for vertical and horizontal position control of a claw carrying the suspension probe to mate the suspension probe and catch receptacle;
   releasing the claw then from the suspension probe;
   removing the attached load from the ship deck for transport to a delivery location.

15. The method defined in claim 14 further comprising:
   loading a container incorporating a self contained shipping structure onto an accessible ship deck;
   opening the container at a desired debarkation location;
   extending a telescoping support track to initiate operation of the positioning arm;
   disgorging a palletized load from the container.

16. A system for engaging a coupling mechanism for rotorcraft hoist connection comprising:
   a first system on a ship deck having a positioning arm with actuators providing multiple degrees of freedom for positioning a suspension probe in response to positioning commands;
   a second system attached to a rotorcraft hoist having thrusters for lateral and rotational motion and a winch for vertical motion for positioning a capture receptacle in response to positioning commands; and
   a controller network to calculate and issue commands to both the first and second systems for mutual actuation control of the thrusters and the actuators for positioning to collocate and connect the suspension probe and capture receptacle.

* * * * *